(12) United States Patent  (10) Patent No.: US 8,264,468 B1
Kurtz et al.  (45) Date of Patent: Sep. 11, 2012

(54) TOUCH SYSTEM FOR BLUE SCREEN

(75) Inventors: Victoria W. Kurtz, Toledo, OH (US); Thomas J. Pavliscak, Palos Verdes, CA (US); Carol Ann Wedding, Toledo, OH (US); Rebecca L. Afzal, Perrysburg, OH (US)

(73) Assignee: Imaging Systems Technology, Inc., Toledo, OH (US)

( * ) Notice: Subject to any disclaimer, the term of this patent is extended or adjusted under 35 U.S.C. 154(b) by 1061 days.

(21) Appl. No.: 12/141,949

(22) Filed: Jun. 19, 2008

Related U.S. Application Data (60) Provisional application No. 60/945,069, filed on Jun. 19, 2007.

(51) Int. Cl.
 *G06T 15/00* (2011.01)
(52) U.S. Cl. .......................... 345/173; 345/629
(58) Field of Classification Search .................. 345/17
 See application file for complete search history.

(56) References Cited

U.S. PATENT DOCUMENTS

| | | | |
|---|---|---|---|
| 3,560,638 A | 2/1971 | Skrydstrup et al. |
| 3,678,182 A | 7/1972 | Boxman et al. |
| 3,775,560 A | 11/1973 | Ebeling et al. |
| 3,778,542 A | 12/1973 | Hanseman |
| 3,860,754 A | 1/1975 | Johnson et al. |
| 3,959,813 A | 5/1976 | Legler |
| 4,051,520 A | 9/1977 | Davidse et al. |
| 4,100,569 A | 7/1978 | Vlahos |
| 4,183,045 A | 1/1980 | Herrmann et al. |
| 4,243,879 A | 1/1981 | Carroll et al. |
| 4,267,443 A | 5/1981 | Carroll et al. |
| 4,319,266 A | 3/1982 | Bannister |
| 4,323,774 A | 4/1982 | Kopp |
| 4,344,085 A | 8/1982 | Vlahos |
| 4,384,201 A | 5/1983 | Carroll et al. |
| 4,417,791 A | 11/1983 | Erland et al. |
| 4,467,193 A | 8/1984 | Carroll |
| 4,645,920 A | 2/1987 | Carroll et al. |
| 4,672,364 A | 6/1987 | Lucas |
| 4,684,801 A | 8/1987 | Carroll et al. |
| 4,713,534 A | 12/1987 | Masters et al. |
| 4,761,637 A | 8/1988 | Lucas et al. |
| 4,797,556 A | 1/1989 | Marzari et al. |
| 4,799,044 A | 1/1989 | Masters et al. |
| 4,818,859 A | 4/1989 | Hough |
| 4,855,590 A | 8/1989 | Bures et al. |
| 4,943,806 A | 7/1990 | Masters et al. |
| 4,968,132 A | 11/1990 | Ferren |
| 4,986,662 A | 1/1991 | Bures et al. |
| 5,041,701 A | 8/1991 | Wolfe et al. |
| 5,055,840 A | 10/1991 | Bartlett |
| 5,164,714 A | 11/1992 | Wehrer |
| 5,220,409 A | 6/1993 | Bures |
| 5,249,039 A | 9/1993 | Chaplin |
| 5,379,215 A | 1/1995 | Kruhoeffer et al. |
| 5,764,306 A | 6/1998 | Steffano |
| 5,940,139 A | 8/1999 | Smoot |
| 6,020,931 A | 2/2000 | Bilbrey et al. |
| 6,052,648 A | 4/2000 | Burfeind et al. |
| 6,429,857 B1 | 8/2002 | Masters et al. |
| 6,490,525 B2 | 12/2002 | Baron, Sr. et al. |

(Continued)

*Primary Examiner* — Amare Mengistu
*Assistant Examiner* — Joseph G Rodriguez
(74) *Attorney, Agent, or Firm* — Donald K. Wedding (57) ABSTRACT

A touch input system comprising a chroma-key/matte display system with a calibrated touch input near or on a matte.

7 Claims, 7 Drawing Sheets

U.S. PATENT DOCUMENTS

| | | |
|---|---|---|
| 6,683,609 B1 | 1/2004 | Baron, Sr. et al. |
| 6,885,744 B2 | 4/2005 | Bluestein et al. |
| 6,952,204 B2 | 10/2005 | Baumberg et al. |
| 7,075,556 B1 * | 7/2006 | Meier et al. .................. 345/629 |
| 2002/0025066 A1 | 2/2002 | Pettigrew |
| 2005/0164762 A1 | 7/2005 | Smith et al. |
| 2005/0248539 A1 | 11/2005 | Morrison et al. |

* cited by examiner

Calibration Factor Library

| Screen Aspect ratio | Screen Pixels | Touch Panel size ratio & and screen position #1 | Touch Panel size ratio & and screen position #2 | Touch Panel size ratio & and screen position #n+1 |
|---|---|---|---|---|
| 16 to 9 | 1980X1090 | Calibration a1 | Calibration an | Calibration a(n+1) |
| 16 to 9 | 1280X720 | Calibration b1 | Calibration bn | Calibration b(n+1) |
| 4 to 3 | 780X480 | Calibration c1 | Calibration cn | Calibration c(n+1) |
| 4 to 3 | 780X576 | Calibration d1 | Calibration dn | Calibration d(n+1) |

TOUCH SYSTEM FOR BLUE SCREEN

RELATED APPLICATION

This application claims priority under 35 U.S.C. 119(e) from U.S. Provisional Patent Application Ser. No. 60/945,069 filed Jun. 19, 2007.

INTRODUCTION

This invention relates to a touch input device system comprising a chroma-key/matte display system with a calibrated touch input system near or on a matte. More particularly, this invention relates to a chroma-key/matte display screen system with a touch input device that allows a user to interact with the display by selecting or pointing to composite images on the display. Touch input devices include camera based, infrared, membrane, and acoustic. Displays screens include CRT, various flat screen displays such as plasma, LCD, OLED, and various projection display systems.

A chroma-key/matte or compositing system is a system that joins or mixes two images (usually a foreground image and a background image). This is usually done by the removal of a color (or small color range) from one image to reveal another "behind" it. The removed color becomes transparent. This technique is also referred to as chroma-key, color keying, or color separation overlay. It is typically used for weather illustrations. It is also used for virtual TV studios and motion picture studios where a scene is created behind a person animal, or object. The presenter, for example a TV weather person, appears to be standing in front of a large map or other background, but in the studio there is actually a large blue or green matte which is a background or backdrop. Chroma-key provides the virtual background on which images appear to be projected when viewed from a camera and the viewing monitor.

A touch system is an electronic system consisting of a touch input device and a display screen. It generally includes hardware and software control and processing means that mediate the electrical interaction between the touch input device and display screen. Calibration of a touch system is the act of aligning the active area of a touch input device with the active area of a display screen.

THE INVENTION

In accordance with this invention, there is provided a touch input system comprising a chroma-key/matte display with a calibrated touch input system near or on a matte. More particularly, in accordance with this invention, there is provided a touch system comprising a chroma-key/matte display system with a touch input device near or on the matte screen, the touch input device being positioned such that the active area of the touch screen is in a fixed known location with reference to the chroma-key/matte backdrop.

In the further practice of this invention, there is provided a method of calibrating a touch system used with a chroma-key/matte display.

In one embodiment, predefined calibration factors are used to adjust the chroma-key/matte active area with respect to the touch input device active area. In such embodiment, one or more predefined calibration factors are stored in memory and accessed by an application program.

Figure 4:
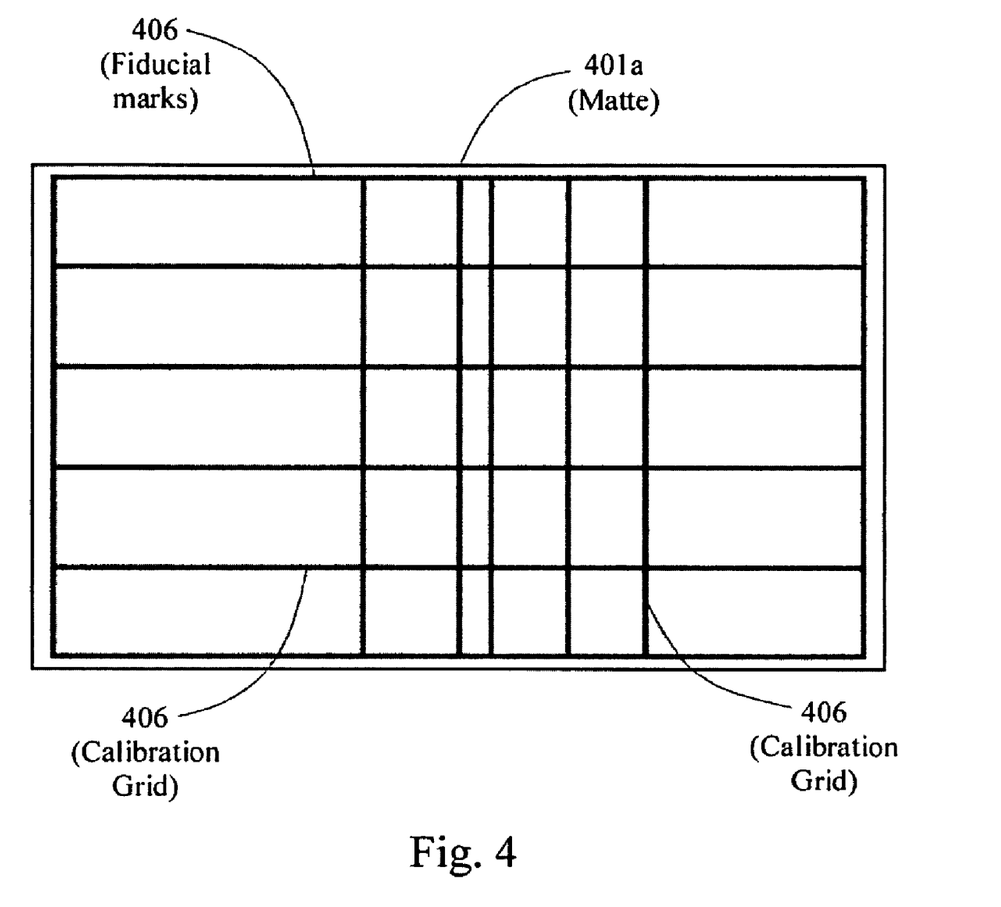
FIG. 4 is a front view of a blue screen matte with a prepainted calibration grid.

In one calibration method, the chroma-key system continuously calculates the calibration factors using known fiducial marks on the screen. As the aspect ration and camera angle changes, the calibration data is automatically updated using known fiducial marks on the matte. The marks on the matte provide the chroma-key system guides for determining exact location on the matte. This data is sent to an application program for use. This is shown in FIG. 4 discussed below.

In another method, one or more calibration factors are derived by the following sequence: a calibration image is shown on the monitor via the chroma-key/matte device; a camera operator lines the field of view of the camera to boundary marks on a template; fiducial marks are touched by the user to correlate known image points with the touch system; and the correlation data is stored in a file for later use as predefined calibration factors. The fiducial marks comprise two or more similar, compatible shades of chroma-key/matte colors in a specific pattern of alignment stripes that are physically on the chroma-key/matte backdrop surface.

The selected stored calibration factors are retrieved to provide rapid image composition changes. An image composition is selected including the relative position and size of the touch input device active area to retrieve the corresponding correlation data (calibration factors) from a stored library. The camera lens focal length (zoom) is adjusted to bring the programmed display template into coincidence with the touch input device fiducial marks.

The application program uses at least two marks, but can use more marks as desired. The marks are used to correlate the composite image with the corresponding location on the matte. Specific areas on the matte are touched, which are used to create the data file.

The location of the areas on the matte to be touched corresponds with the application program as determined in advance by "Trial and Error" or by some other method. Other methods include predefined laser hatch marks which have a dual purpose for a calibration system and/or for aligning printed circuit boards (PCBs) on the matte during installation of the system.

If the screen aspect ratio or number of pixel in the camera field of view or camera angle changes, the system may need to be recalibrated. Camera zoom will not affect the calibration data.

In another calibration method, a predefined data file is used to correlate the aspect ratio of the screen to the number of pixels. This is an empirical calculation of the same data calculated by touching known points on the screen as described in the second method. The data is calculated before the system is installed and stored in a larger data file.

If the screen aspect ratio or the number of pixels in the camera field of view or camera angle changes, the system will access the new calibration data. Camera zoom will not affect the calibration data.

The correlated data in each of these above methods may be used to derive additional calibration factors through mathematical calculations.

This invention also provides for the aligning of the touch input device positioned on a chroma-key/matte backdrop or background by using either a laser beam or other leveling means to assure that a level line is determined with respect to a known reference such as a floor.

The mounting features on the touch input device hardware may be used to facilitate accurate mounting including repeating patterns of holes that can be used to insert mounting hardware.

In one embodiment, the touch system is an infrared (IR) touch system device. The framework of the IR touch input device consists of a four strips or supports each at right angles to one another so as to form a square or rectangle that define the active touch area of the touch input device. PCBs with infrared LED sensors and emitters are mounted on the strips or supports. The strips may be mounted on or slightly recessed in the chroma-key/matte background or backdrop surface.

The strips may also be coated with chroma-key/matte compatible color to assist in camouflaging the frame for wider camera shots. The LEDs in the PCBs may be recessed slightly in the frame, so as to reduce the interference from studio ambient light.

IR Touch System

Infrared (IR) touch systems contemplated herein include those disclosed in U.S. Pat. Nos. 3,775,560 (Ebeling et al.), 3,860,754 (Johnson et al.), 4,243,879 (Carroll et al.), 4,267,443 (Carroll et al.), 4,323,774 (Kopp), 4,384,201 (Carroll et al.), 4,467,193 (Carroll), 4,645,920 (Carroll et al.), 4,672,364 (Lucas), 4,684,801 (Carroll et al.), 4,713,534 (Masters et al.), 4,761,637 (Lucas et al. 4,797,556 (Mazari et al.), 4,799,044 (Masters et al.), 4,818,859 (Hough), 4,855,590 (Bures et al.), 4,943,806 (Masters et al.), 4,986,662 (Bures), 5,041,701 (Wolfe et al.), 5,055,840 (Bartlett), 5,164,714 (Wehrer), 5,220,409 (Bures), and 6,429,859 (Masters et al.), all of which are incorporated herein by reference.

Blue Screen

Blue screen is disclosed in U.S. Pat. Nos. 3,778,542 (Hanseman), 4,100,569 (Vlahos), 4,344,085 (Vlahos), 4,417,791 (Erland et al.), 5,764,306 (Steffano), 5,940,139 (Smoot), 6,020,931 (Bilbrey et al.), 6,885,744 (Bluestein et al.), 6,952,204 (Baumberg et al.), U.S. Patent Application Nos. 2005/0,248,539 (Morrison et al.), 2005/0164762 (Smith et al.), and 2002/0025066 (Pettigrew), all of which are incorporated herein by reference.

Blue Screen Matte

Blue screen matte is disclosed in U.S. Pat. Nos. 3,778,542 (Hanseman) and 4,968,132 (Ferren), both of which are incorporated herein by reference.

Chroma-Key

Chroma-key is disclosed in U.S. Pat. Nos. 3,560,638 (Skrydstrup et al.), 3,678,182 (Boxman et al.), 3,959,813 (Legler), 4,051,520 (Davidse et al.), 4,183,045 (Hermann et al.), 4,319,266 (Bannister), and 5,249,039 (Chaplin), all of which are incorporated herein by reference.

Weather Data Processing

Weather data processing is disclosed in: U.S. Pat. Nos. 5,379,215 (Kruhoeffer et al.), 6,052,648 (Burfeind et al.), 6,490,525 (Baron Sr. et al.), and 6,683,609 (Baron Sr. et al.), all of which are incorporated herein by reference.

DETAILED DESCRIPTION OF THE DRAWINGS

A touch screen is a hardware device with mechanical attributes that define an active area. Blue or green matte screens do not have a fixed active area. Instead they can be continually reconfigured based on the zoom of a camera that is filming or transmitting the matte screen. Because of this, a difficulty arises in using a touch screen with a matte screen.

When a touch screen is used with a standard display such as a CRT, plasma display, LCD, or other technology, it generally requires calibration. This calibration typically occurs one time when the touch screen is first applied to the display.

Figure 1:
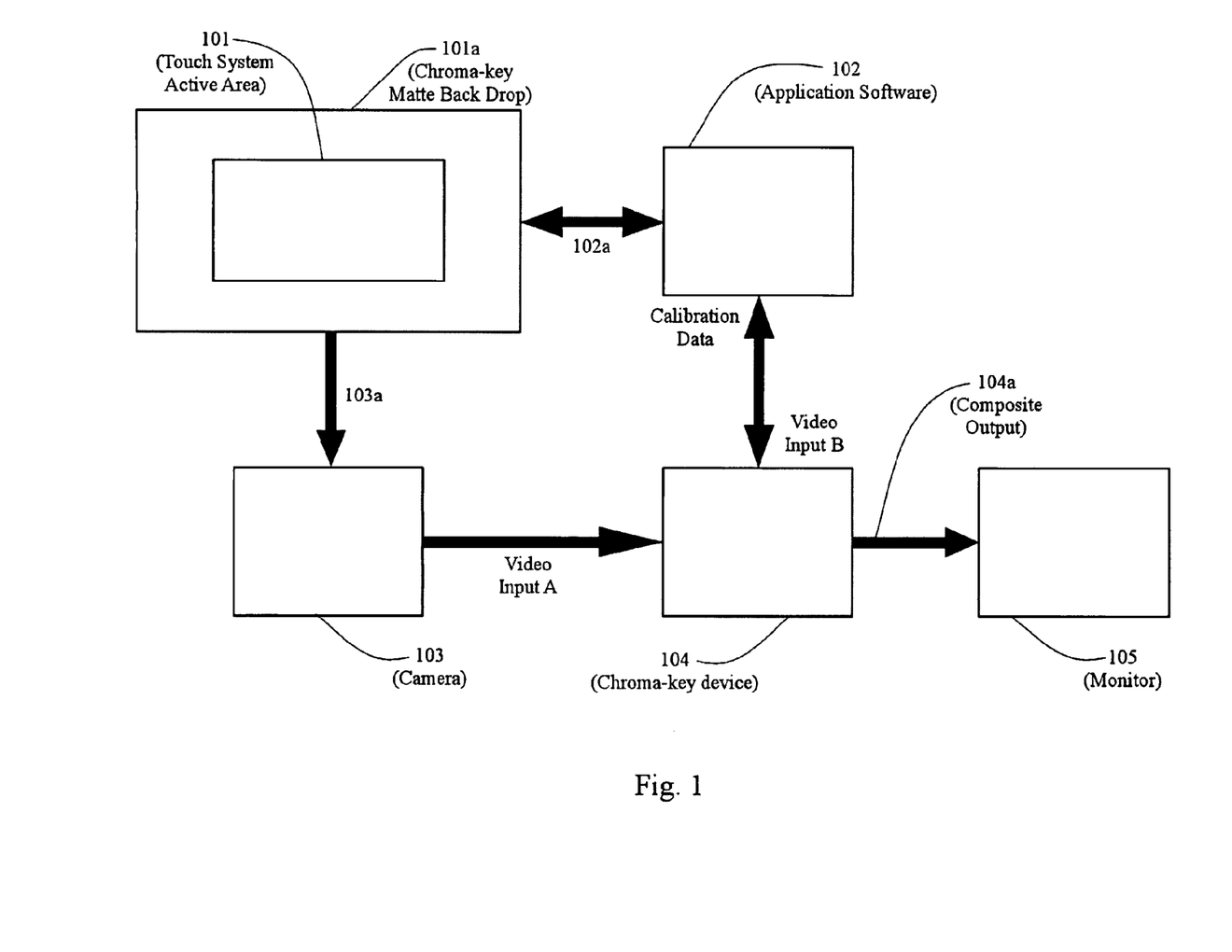
FIG. 1 shows a block diagram of a chroma-key or blue screen system with a touch screen.

A block diagram of a chroma-key blue screen system or compositing system is shown in FIG. 1. The overall system shows a touch system active area 101 near or on a chroma-key matte backdrop 101a, application software 102 providing video input B and camera 103 providing video input A to chroma-key compositing device or system 104, and monitor 105 for viewing the composite output 104a. The touch screen active area 101 is positioned near or on the matte backdrop 101a which is typically blue or green. The touch device can be physically positioned on the matte or if the touch device is camera based only the active touch area will be positioned on the matte and the camera is mounted off the matte.

The touch screen communicates 102a via touch screen application software 102 with the chroma-key compositing system (or mixer device) 104, which combines a foreground image 103a such as a person (weather forecaster) with a background image such as a map, the composite output 104a, that is viewed on the monitor 105.

The relative size and position of the foreground image will change based on the zoom and position of the camera 103 filming the foreground image. To use a touch screen with a matte screen and compositing device, it is necessary to keep the touch screen calibrated with the respect to the foreground image. Because the foreground image typically changes during use, the touch screen must calibrate in real time.

In this invention, there is provided the calibration of a touch screen, as discussed above for use with a matte screen or compositing system that allows for adjustment as camera zoom and position change. The system is calibrated for all the known camera angles and zooms. In a typical studio setting this may be less than ten, typically less than five unique angles. The calibrations are stored in memory as calibration factors. These are accessed in response to changing camera angles and zooms.

Figure 3:
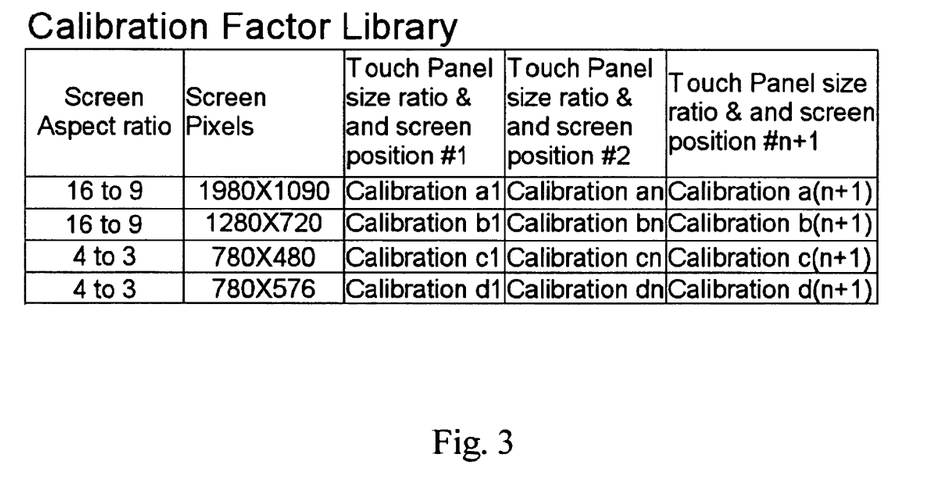
FIG. 3 is a calibration library used in the practice of this invention.

Calibration is necessary to correlate the active area of the touch screen with the viewed image on the monitor display 105 as shown in FIG. 1. In general, calibration is a procedure as described above in which the user is cued to touch known points on the screen. This act correlates the touch of the touch screen with a known reference point as described in the above methods. This allows correction of misalignment, and slight differences in aspect ratio between the touch screen and the display. A Calibration Factor Library is used as shown in FIG. 3.

Figure 2:
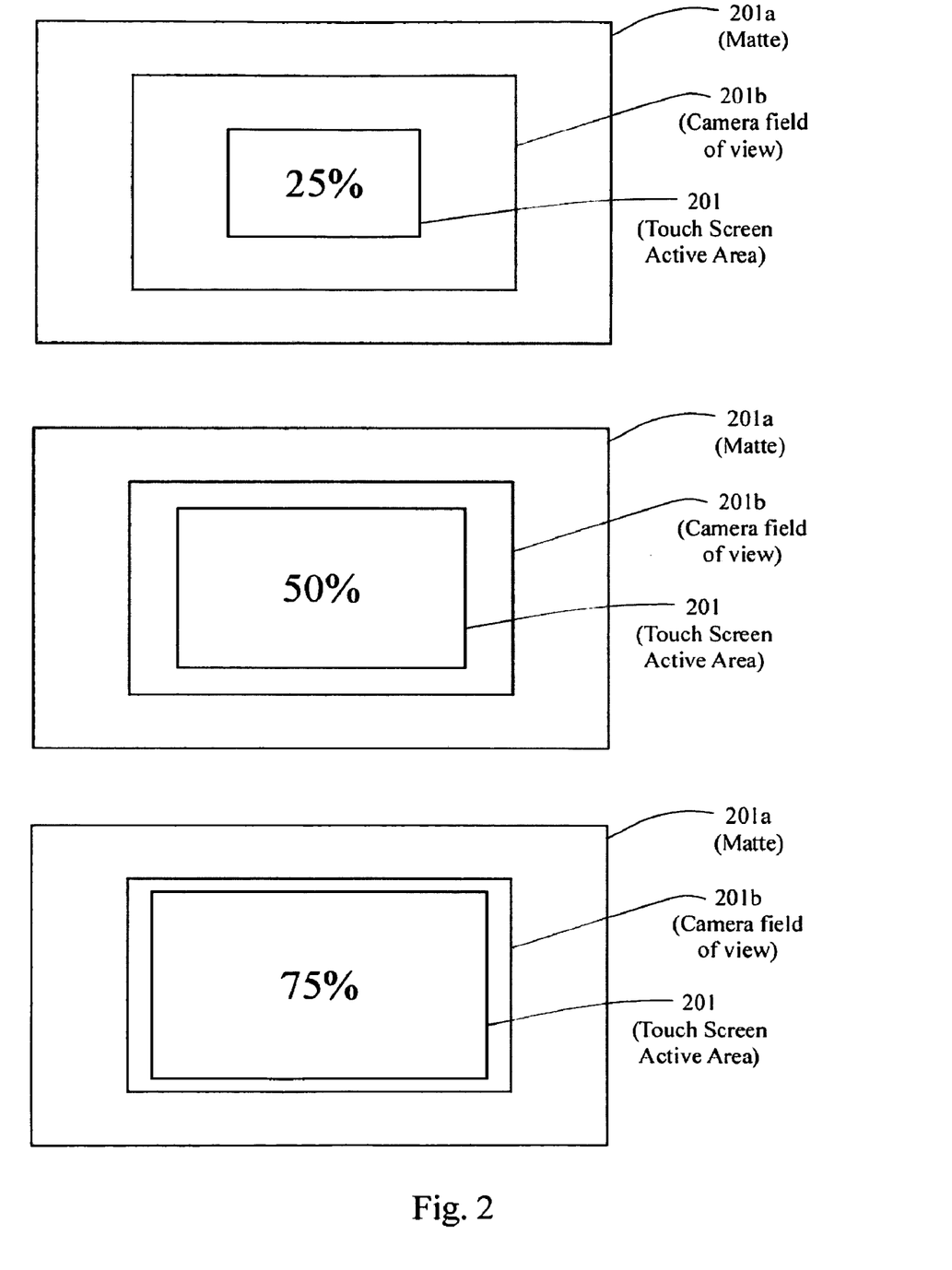
FIG. 2 is illustrative of different blue screen camera zooms compared to a touch screen used with the blue screen.

In this invention, a touch screen device (not shown) is located near or on a blue or green matte background or backdrop 201a. As shown in FIG. 2, the camera zoom 201b may range, for example 25% to 75% of the matte 201a. As the camera increases zoom, the touch screen device encompasses a larger percent of the composite image.

An IR touch screen is very suitable for this invention because the IR touch screen can be made very large and kept out of the camera view. Camera based touch screens can also be kept out of view. Some touch devices such as membrane touch are not well suited for this application because of reflection. When an IR touch screen is used, it can be made the same color as the backdrop to further disguise it. LEDs may also be recessed in the IR device. The system may be aligned using special mounting holes and laser levers.

FIG. 4 shows a matte backdrop 401a with prepainted fiducial marks 406. Fiducial marks 406 consisting of compatible chroma-key colors can be applied to the matte background or backdrop 401a. These may also serve as calibration markers for the camera and the touch screen (not shown).

FIG. 4 describes a calibration method using two similar, but distinct blue screen colors. Fiducial marks 406 of similar but distinct colors are painted, or otherwise marked on the matte 401a. The fiducial marks 406 are a complimentary color to the matte 401a color.

Calibration factors are determined by the chroma-key or another program and allow calibration factors to be determined whenever the angle of camera, aspect ratio, and/or pixel count is changed.

Figure 5A:
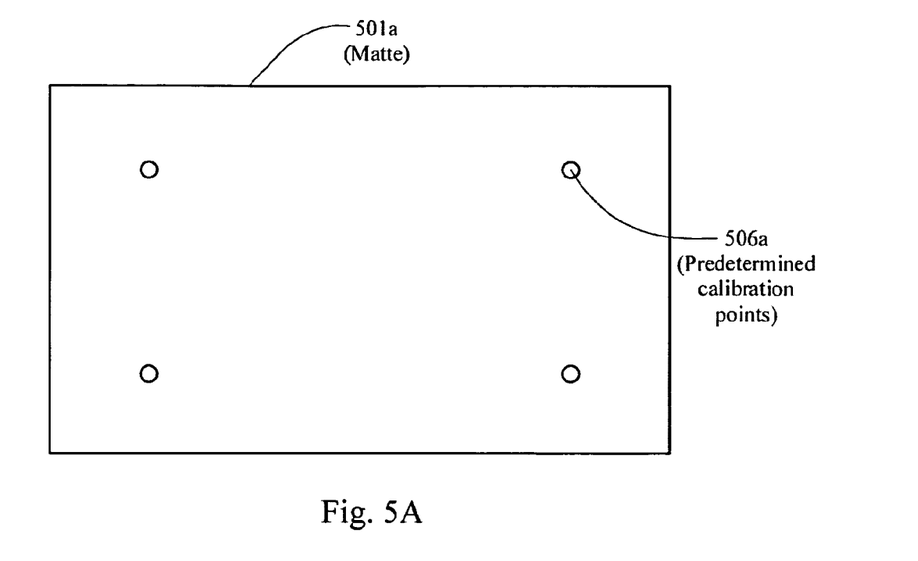
FIG. 5A is a front view of a blue screen matte with predetermined calibration points.

FIG. 5A is a front view of a blue screen matte 501a with predetermined calibration points or fiducial marks 506a. FIG. 5A describes a method of calibrating the touch system (not shown) using known coordinates. These calibrations points or fiducial marks 506a are predetermined using application program and/or touch system driver utilities.

Calibration points or fiducial marks 506a are marked on the screen using a complimentary similar color as the matte 501a and are touched to determine calibration data for an application program.

Figure 5B:
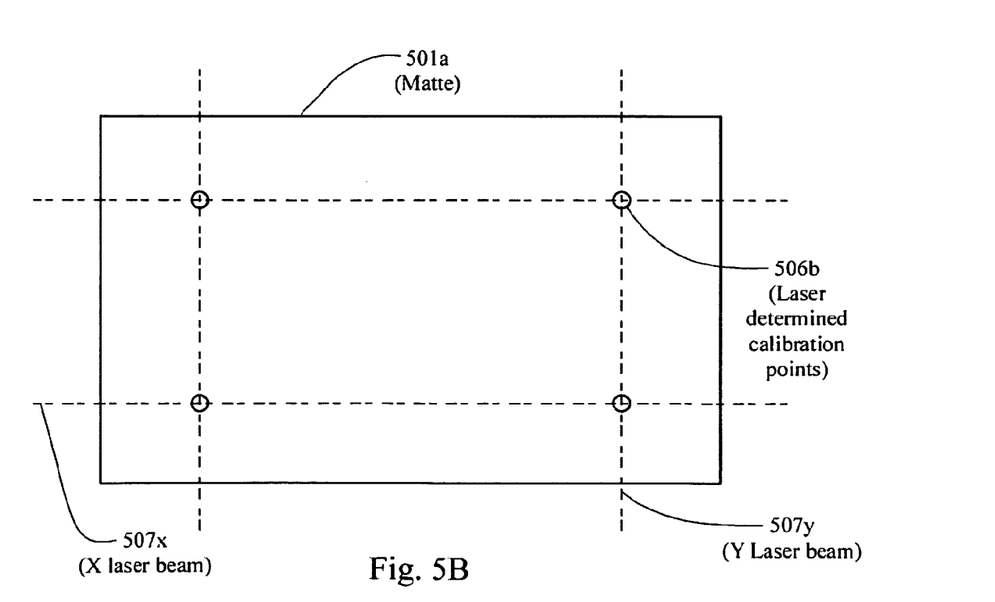
FIG. 5B is a front view of a blue screen matte with laser determined calibration points.

FIG. 5B is a front view of a blue screen matte 501a with laser determined calibration points or fiducial marks 506b. FIG. 5B describes another method of calibrating the touch system (not shown) using known coordinates. These calibrations points or fiducial marks 506b are predetermined using application program and/or touch system driver utilities.

These calibration points or fiducial marks 506b are not marked on the matte 501a, but are obtained via lasers (not shown) attached to all sides of the touch system (not shown). The X laser beams 507x are aligned to form one single line. Similarly, the Y laser beams 507y are aligned to form one single line. The intersection of X and Y laser beams 507x and 507y correspond to calibration points or fiducial marks 506b that are touched to determine calibration.

Predetermined calibration points 506b are obtained by lining up two lasers beams 507x and 507y in both the X and Y-axis. A single line of laser beams 507x and 507y is aligned in both the X and Y direction, and the intersection will form the calibration points or fiducial marks 506b.

Figure 6A:
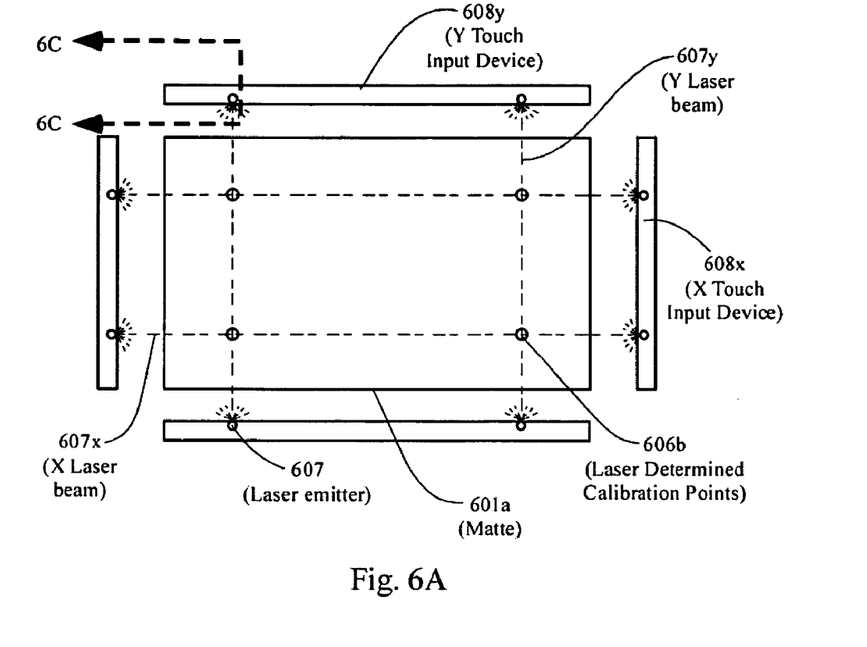
FIG. 6A is a front view of the present invention with lasers in alignment.

FIG. 6A is a front view of the present invention with laser beams 607x and 60'7y in alignment. The view shows Y touch input device 608y, Y laser beam 607y, X touch input device 608x, laser determined calibration points 606b, matte 601a, laser emitter 607, and X laser beam 607x.

FIG. 6A describes a method to install and align the touch system hardware 608y, 608x on the matte 601a. Laser emitters 607 are fixed to the touch system frame 608y and 608x. The laser emitters 607 are positioned to assure the touch system 608y, 608x is level with the opposite frame edge.

When the touch system 608y, 608x is installed, the laser beams 607x, 607y will converge to a single line of light, which will signify the system is perfectly aligned with the opposite side. X laser beam 607x is a laser light beam that is used to identify when the two x-axes are completely aligned, as both x light beams will converge to a single line. Y laser beam 607y is laser light beam that is used to identify when the two y-axes are completely aligned, as both y light beams will converge to a single line.

Predetermined calibration points or fiducial marks 606b are obtained by lining up two lasers beams 607x and 607y in both the X and Y-axis. A single line of laser beams 607x and 607y is aligned in both the X and Y direction, and the intersection will form the calibration points or fiducial marks 606b.

Figure 6B:
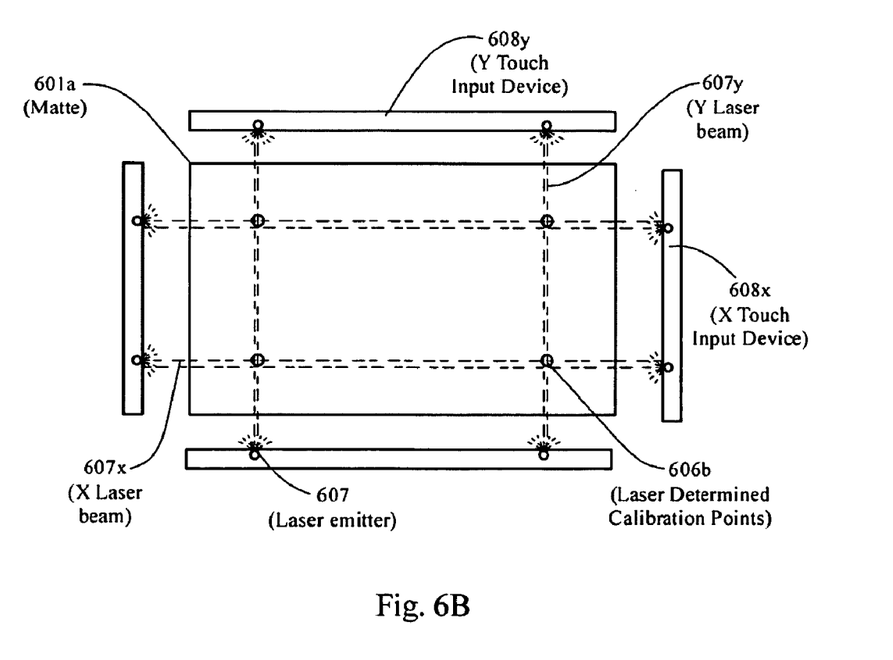
FIG. 6B is a front view of the present invention with lasers out of alignment.

FIG. 6B is a front view of the present invention with laser beams 607x and 607y out of alignment. The view shows Y touch input device 608y, Y laser beam 607y, X touch input device 608x, laser determined calibration points 606b, matte 601a, laser emitter 607, and X laser beam 607x. Laser emitters 607 are fixed to the touch system frame 608y and 608x. The laser emitters 607 are positioned to assure the touch system 608y, 608x is level with the opposite frame edge.

Because the system is not aligned properly, the horizontal and vertical laser beams 607y, 607x do not converge into a single horizontal and vertical line respectively. The intersection is not a single point. The system is not properly aligned, and intersection of horizontal and vertical laser beams 607y, 607x is not accurate enough to be used as calibration points or fiducial marks 606b. X laser beam 607x is a laser light beam that is used to identify when the two x-axes are completely aligned, as both x light beams will converge to a single line. Y laser beam 607y is laser light beam that is used to identify when the two y-axes are completely aligned, as both y light beams will converge to a single line.

Because there is no single intersection of X and Y laser beams, the system is not properly aligned. Intersection points are not to be used for points or fiducial marks 606b.

Figure 6C:
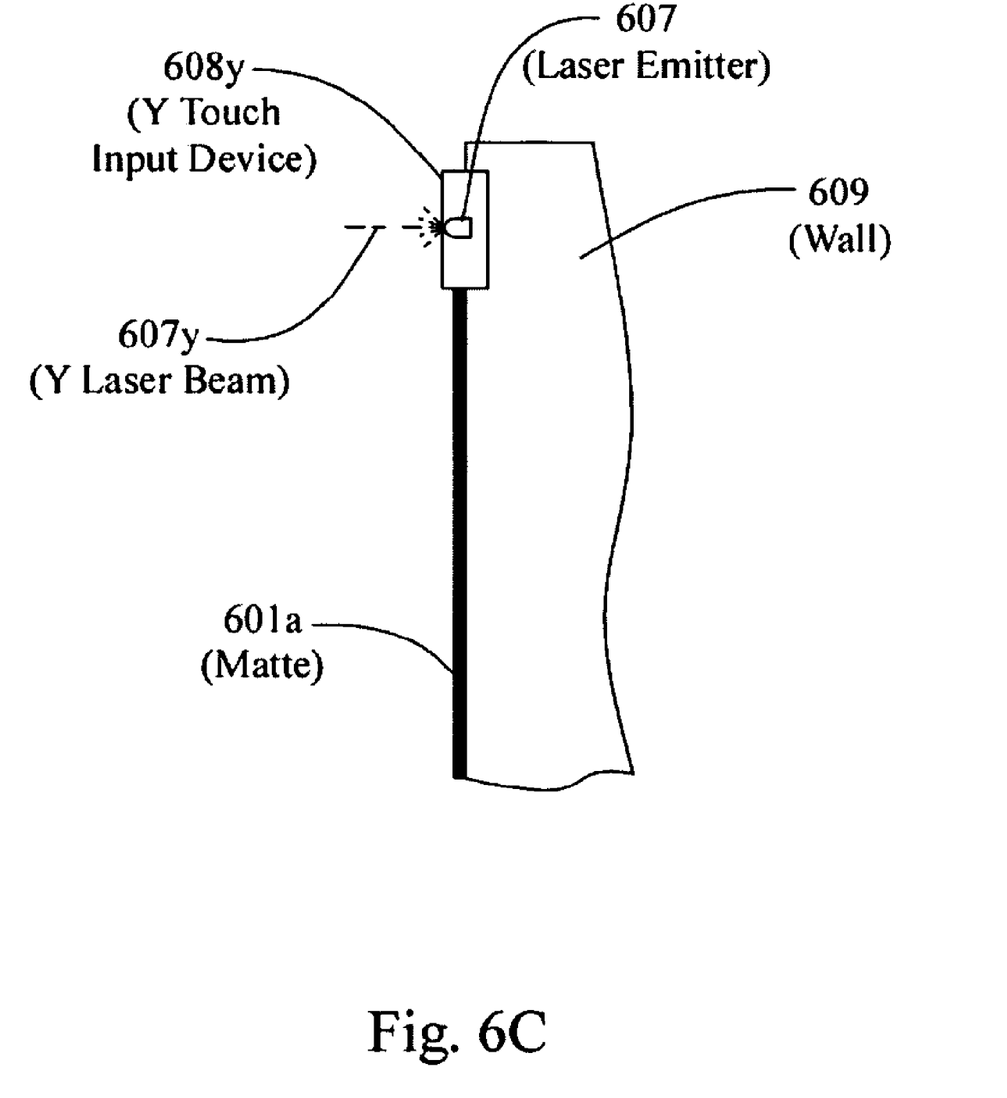
FIG. 6C is a section 6C-6C view showing Y touch input device partially embedded in a wall.

FIG. 6C is a section 6C-6C from FIG. 6A view showing Y touch input device 608y with laser emitter 607 partially embedded in a wall 609, Y laser beam 607y being emitted from laser emitter 607, and matte 601a on the wall 609. FIG. 6C shows the touch system 608y mounted into the matte background 601a slightly recessed, to reduce shadows, and to facilitate masking of the touch system frame with the matte.

Y touch input device 608y is mounted on to the wall 609 to provide for interactivity with chroma-key/Matte system. The laser emitter 607 is secured to the touch system device 608y to facilitate installation as well as calibration of the touch input device 608y.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In a display system comprising a video display, a video camera, a chroma-key device, and a matte backdrop having a display area within a field of view of the video camera,
the improvement wherein the matte display area is provided with a touch input device having a touch area,
said touch input device being positioned such that the touch area of the device is in a fixed location with reference to the matte display area,
said matte display area containing fiducial marks at predetermined locations within the touch area,
images being generated on the video display with the video camera, the chroma-key device, and the matte backdrop,
the touch input device being calibrated with the images on the video display using the fiducial marks in the matte display area.

2. The invention of claim 1 wherein the touch input device is an IR touch system device.

3. The invention of claim 1 wherein the fiducial marks comprise two or more compatible shades of chroma-key/matte colors in a specific pattern of alignment stripes physically in a viewing surface of the chroma-key/matte backdrop.

4. A method of calibrating a touch system comprising a chroma-key device, a camera, a video display, a matte backdrop having a display area within a field of view of the camera, and a touch input device having an active touch area wherein the touch input device is positioned such that the active touch area of the touch device is in a fixed location with reference to the display area of the matte backdrop, which comprises placing fiducial marks at predetermined locations within the matte display area and the active area of the touch screen, generating a composite image on the video display with the video camera, the chroma-key device and the matte backdrop, and calibrating the touch input device with the images on the video display using the fiducial marks on the matte display area.

5. The invention of claim 4 wherein predetermined locations of the matte are touched, said locations corresponding to locations on the composite image for calibration of the touch input device.

6. The invention of claim 4 wherein fiducial marks consist of two or more compatible shades of chroma-key/matte colors in a specific pattern of alignment stripes physically on the chroma-key/matte backdrop surface.

7. The invention of claim 4 wherein the touch input device is an JR touch system device.

* * * * *